United States Patent Office 2,994,762
Patented Aug. 1, 1961

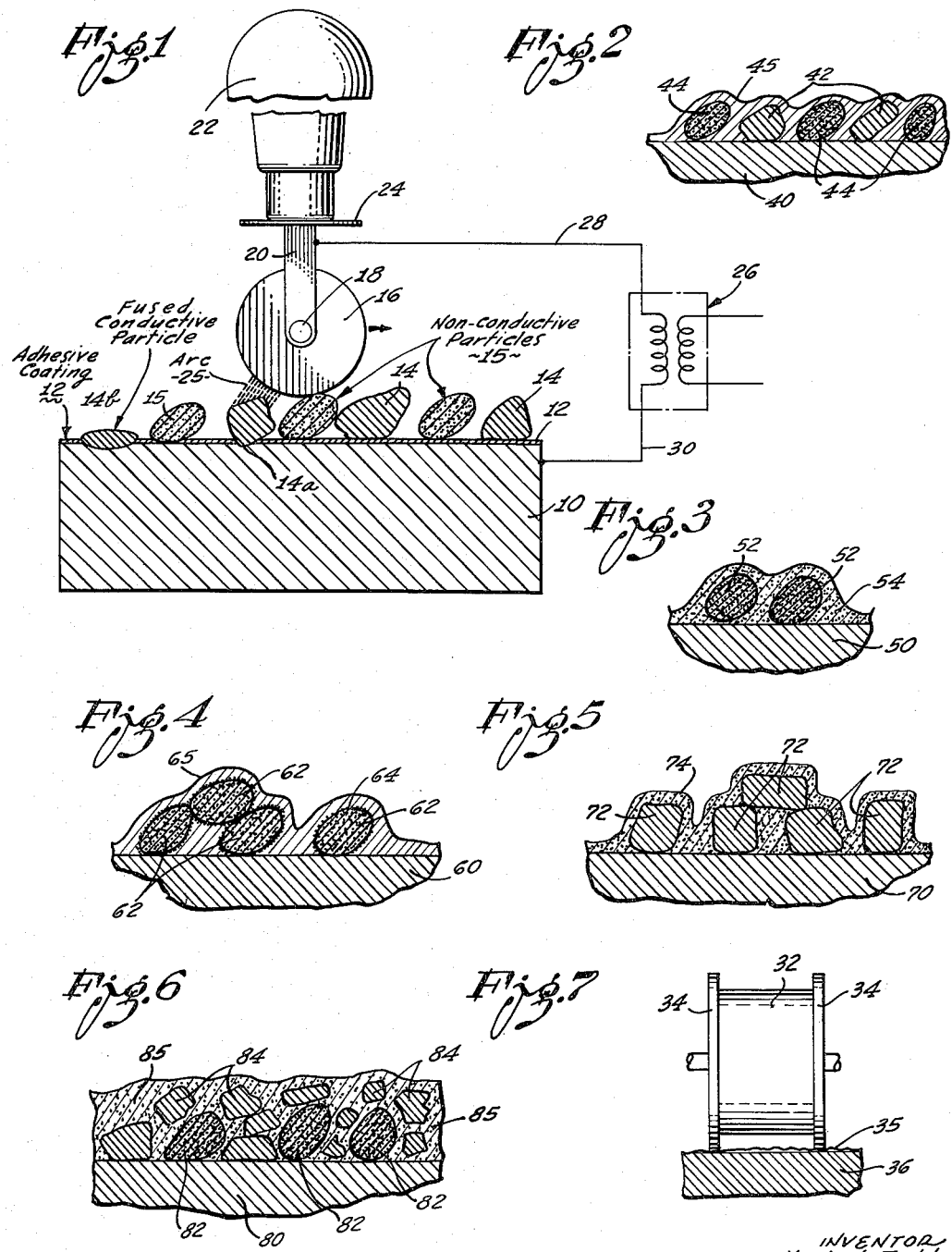

2,994,762
METHOD OF FUSING MATERIALS TO METAL SURFACES
Hoyt H. Todd, 1356 Coachman Ave., Whittier, Calif., assignor of one-tenth to Jess M. Roberts, Los Angeles, Calif.
Filed Sept. 8, 1959, Ser. No. 838,718
22 Claims. (Cl. 219—76)

This invention relates to a method of depositing alloying material on a metal body by arc welding. The alloying material is fused with the base metal for such purposes of wear resistance, corrosion resistance, and oxidation resistance. The present invention is a continuation-in-part of my pending application having the same title, Serial No. 799,325, filed March 13, 1959, now abandoned.

The prevailing methods of both arc welding and gas welding have certain serious disadvantages. It is difficult to apply these prior art practices for welding material to thin metal sections because of "burn through" by a melting of the base metal. The prior art welding processes soften the heat treated or hardened substrate because of the large heat input of the continuous flame or arc. In welding material to high carbon steels cracking of the weld or cracking of the base metal can be prevented only by the precautions of preheating the base metal prior to the welding operation and cooling the base metal and the added metal slowly after the welding operation. The usual arc and gas welding methods are expensive because they require skilled labor and consume relatively large amounts of weld material. In addition it is costly to heat the base metal in preparation for such welding operations. Prior art welding methods are further limited in application since they do not lend themselves to the welding of certain dissimilar materials. To my knowledge no prior art method has been successful for bonding together such dissimilar materials as aluminum and iron and aluminum and nickel.

Broadly described, the present invention avoids these disadvantages by employing granular material, the alloying material being in the form of small particles, spreading the granular material in a layer over the surface of the base metal, and then creating minute arcs to weld the individual alloying particles to the base metal.

If the surface of the base metal that is to be processed is flat, the particles of the granular material may be simply loosely distributed over the surface. It is desirable, however, to bond the layer of granular material to the base metal by suitable adhesive in preparation for the welding operation. In one procedure the granular material is mixed with a suitable liquid vehicle to form a paint-like composition and the surface of the metal body is coated with this composition in preparation for the actual welding step. In another procedure the base metal is first coated with adhesive material and then the granular material is applied to the adhesive coat to be bonded thereby to the surface of the base metal.

The actual welding operation is carried out by first setting up a welding circuit including the base metal and an electrode many times wider than the alloying particles and then passing the electrode across the layer of particles in a path close to the surface of the base metal to strike minute arcs with the individual alloying particles, the arcs being distributed across the width of the electrode.

With conventional low frequency current or direct current as usually employed for arc welding, the arcs may be created by first contacting the individual particles with the electrode and then drawing the electrode away from the particles. In this regard one of the features of the invention is the inclusion of carbon in the layer of the alloying particles to promote the creation of the minute arcs. There is reason to believe that the negative coefficient of resistance of the carbon is important. Apparently the carbon constituent of the layer heats up rapidly by resistance in response to the contact of the electrode and then flashes or vaporizes to promote the creation of the minute arcs. The carbon may be particles of carbon or graphite in the layer that is applied to the surface of the base metal or the carbon may be provided by incorporating in the layer some material that decomposes to deposit carbon in response to the heat generated in the welding operation.

The use of carbon to promote arcing and the necessity of the electrode making actual contact with the alloying particles may be avoided by using high frequency welding current. For this purpose the welding circuit may be of any of the types employed in welding with high frequency current or of the types employed in electric discharge machining. The arcs may be varied in voltage, intensity and frequency for various effects in accord with the well known principles of arc welding and of electric discharge machining. The present disclosure is mainly devoted, however, to the use of conventional low frequency welding current.

The electrode may be guided along the desired path in a suitable manner. It has been found that guiding the electrode with the desired small spacing between the electrode and the base metal may be simplified by using the layer of particles as spacer means. For this purpose the electrode may be simply moved across the layer in guiding contact with the layer. In the preferred practice of the invention, the electrode is a roller that is rolled across the layer. A carbon roller gives excellent results with no troublesome tendency for the material from the layer to stick to the roller.

If high frequency current is used, non-conductor spacer means may be associated with the electrode to keep the electrode out of contact with the layer. Thus if a carbon roller is used, a ceramic roller or a ceramic flange larger in diameter than the electrode roller may make guiding contact with the layer.

If the electrode, for example a plain carbon roller, is used in direct contact with the layer on the base metal, the layer may consist essentially of the particles of alloying material with carbon added to promite arcing. The electrode is moved back and forth to create the arcs. On one pass of the electrode, the higher alloying particles are flattened by arcs, i.e. the alloying particles that protrude the greatest distance from the surface of the base metal. On the next pass with the previously highest alloying particles out of the way, the next higher particles are contacted and flattened by arcs. Thus the alloying particles themselves serve as spacer means for guiding the electrode along the desired path relative to the surface of the base metal. In such a procedure the alloying particles may be coated with the arc promoting carbon.

In other practices of the invention, spacer particles are included in the granular layer. These spacer particles may be carbon to perform the additional function of promoting the arcs and in some instances for the further function of increasing the carbon content of ferrous base metal. These spacer particles may be non-conducting, refractory or heat-resisting materials. The terms refractory and heat-resisting are intended to refer to flame-resistant materials commonly employed in furnaces and crucibles. The spacer particles may be of approximately the same size as the alloying particles or the alloying particles may be minute in size in comparison with the spacer particles. For example the size of the spacer particles may be in the range of 30 mesh to 100 mesh and the alloying particles may be only a few microns in size, the spacer particles being from 100 to 300 times as large as the alloying particles. If spacer particles are not employed and the alloying particles serve the spacer function, the same difference in size may exist, the alloying particles being many times larger than the carbon particles.

When the particles of the granular composition differ so greatly in size, the smaller particles may be bonded to the surface of the larger particles. For this purpose the particles may be suspended in a suitable liquid or adhesive to form a paint-like composition for coating the surface of the base metal in preparation for the welding operation. When the adhesive dries it coats the larger particles to bond the smaller particles to the larger particles and to bond the larger particles to the base metal.

In another procedure, the smaller particles and the larger particles are mixed with a suitable adhesive and the mixture is permitted to dry to solid state. The solids are then broken up into small clusters of the mixed particles. The small clusters produced in this way are then mixed with a second adhesive to form a paint-like mixture for coating the base metal, the two adhesives being nonsoluble in each other.

Either of these two procedures may be employed to bond small carbon particles to larger particles. As heretofore noted, however, the carbon may be provided by thermal decomposition and the adhesive for the paint-like suspension may be the material that decomposes for this purpose. The thermal decomposition in the presence of the arcs causes the released carbon to be deposited on the larger particles.

The arcs may merely fuse the alloying particles to the base metal leaving the particles largely intact and protruding from the base metal or at the other extreme the arcs may flatten the alloying particles and drive them substantially flush with the surface of the base metal. Anyone skilled in the art may achieve any effect desired between these two extremes. The size of the spacer particles affects the depth of penetration of the arcs since the larger the particles the fewer number of arcs burning at any particular moment and the fewer the paths of current flow the heavier the current that flows along each path for greater depth of penetration. It may also be readily appreciated that the wider the electrode roller the greater the number of simultaneous arcs with less current in each of the arcs. I have found that if the size of the spacer particles and the layer on the base metal is in the range of 40 to 60 mesh, an open circuit voltage of 60 volts and a voltage across the arcs of 40 volts with a current flow in the range of 75 to 150 amperes give satisfactory results for most applications. As pointed out hereafter, arc stabilizers which may be added to the layer on the base metal also influence the depth of peneration of the arcs.

If it is desired to cover the surface of the base metal completely, the procedure of applying the granular layer to the base metal and arc welding the alloying particles of the layer to the base metal may be repeated as often as desired or necessary. In this regard a feature of the invention is that in most instances there is no marked tendency for the repetition of the welding operation to cause buildup for the formation of ridges by the weld material.

As heretofore stated, the spacer particles may be carbon or some similar material such as the semiconductor silicon carbide or may be a nonconducting refractory material. Refractory materials such as glass, aluminum oxide, magnesium oxide, aluminum silicate, magnesium silicate and calcium silicate may be employed. The carbon may be in the form of graphite particles or carbon particles or may be provided by the thermal decomposition of a suitable organic material.

Various arc stabilizers may be added to the granular material, for example, titanium containing materials such as $TiO_2$ or ilmenite ore and various alkali or alkaline earth containing compounds such as calcium fluoride, potassium feldspars, potassium carbonate, potassium titanate and lithium compounds such as lithium carbonate. The penetration of the weld deposit into the base metal may be varied by selection among the stabilizers. Potassium compounds result in relatively high beads or nuggets. Titanium compounds result in greatly flattened deposits or nuggets. In general increasing the percentage of the arc stabilizer in the layer with which the base metal is coated reduces the depth of penetration by the arcs. Organic compounds may also be used of the character which give off gases for arc stabilization, for example phenolic resins, wood flour, cellulose flour and the like.

Various deoxidizers may be added to the applied layers. Suitable deoxidizers include silicon, manganese and chromium.

Various adhesives may be employed. Excellent results have been obtained with organic liquids containing a thermosetting resin. Such resins include, for example, phenol-formaldehyde resins, melamine, epoxies, polyesters, and the like. An alcohol soluble phenolic resin does not stick to the electrode and has the further advantages of forming a carbon film by thermal decomposition to promote arcing and of releasing gas to stabilize the arcs. For bonding particles together in the form of small clusters, the adhesive may be cellulose nitrate and for making a paint-like coating composition the small clusters may be suspended in an adhesive comprising a phenolic resin. Neither of these two adhesives is soluble in the other.

The alloying particles included in the applied layer, i.e., the layer with which the base metal is coated in preparation for the welding operation, may be metals or metal compounds. In most practices of the invention the alloying particles of the applied layer are welded to the base metal with no significant chemical change. In some practices, however, chemical reactions change the character of the applied particles. For example, an oxide of a metal may be reduced by the welding operation to result in the deposit of the metal. Such a process is especially advantageous where metal in form of the oxide is much cheaper than the pure metal. As another example, particles of two different metals may be incorporated in the applied layer to result in the deposit or welding of a compound of the two metals.

The features and advantages of the invention may be understood from the following detailed description together with the accompanying drawing.

In the drawing, which is to be regarded as merely illustrative:

FIG. 1 is diagrammatic view largely in cross section showing how an electrode in the form of a roller may be applied to a layer of particles on the surface of a metal body, the size of the particles of the layer being greatly exaggerated;

FIG. 2 is a diagrammatic sectional view showing a layer on base metal in the form of a paint-like coating incorporating alloying particles and separate spacer particles;

FIG. 3 is a similar view in which the paint-like coating incorporates relatively large spacer particles and exceedingly small alloying particles, the alloying particles being in the suspension medium;

FIG. 4 is a similar view in which the exceedingly small alloying particles are bonded to the larger spacer particles thereby forming clusters of particles in the paint-like coating;

FIG. 5 is a similar view illustrating a paint-like coating that incorporates relatively large alloying particles together with much smaller particles of carbon;

FIG. 6 is a similar view in which the paint-like coating has relatively large spacer particles and only slightly smaller alloying particles; and FIG. 7 is an elevational view showing how a carbon roller may be provided with non-conducting spacer flanges for use in a high frequency welding circuit.

FIG. 1 shows a metal body 10 which is to be processed and shows diagrammatically how a layer of particles may be placed on the surface of the body. In this instance, the particles are initially secured in place by means of an adhesive coating 12 on the surface of the metal body 10. The layer is substantially one particle thick, but may be thicker, and comprises particles 14 of conductive material which may be termed alloying particles and particles 15 of heat-resistant non-conductive material that are dispersed among the conductive particles and may be termed spacer particles.

In the procedure illustrated by FIG. 1, an electrode in the form of a roller 16 is used, this electrode being mounted on an axle 18 that is carried by a bracket 20. The bracket 20 is unitary with a handle 22 and a non-conductive shield 24. The roller 16 may be a carbon roller or may be a hollow water-cooled copper roller.

The metal body 10 and the electrode 16 are connected to opposite sides of a suitable welding circuit which may be a conventional D.C. circuit, a conventional low frequency circuit or a high frequency circuit. In the drawing a transformer 26 is connected by a conductor 28 with the electrode 16 and is connected by a conductor 30 to the metal body 10.

With the particles 14 and 15 of the particle layer bonded temporarily to the metal body 10 by the adhesive coating 12, the electrode 16 is run over the coated area until all the particles have been contacted by the roller and the conductive particles have been fused to the metal body 10. It is apparent that the electrode roller 16 will roll over the nonconductive particles 15 and will thereby be maintained at a substantial constant minute distance from the surface of the base metal, i.e. from the surface of the metal body 10, the spacing of the electrode from the metal body being substantially the thickness of the non-conductive spacer particles 15. In this instance, the heat-resistant spacer particles 15 are silica particles. The electrode may be moved back and forth over the surface layer of particles as required for thoroughly covering the desired area. These nonconductive spacer particles serve to regulate the length of the arcs that are created and the percentage of the nonconductive spacer particles that are in the layer determines the amount of current flow. Various current values may be used for different particle sizes, for different particle materials, for different depths of fusion penetration and different proportions of conductive and nonconductive particles. The required current values may be determined by anyone skilled in the art of welding by simply observing the results.

In the drawing, the roller electrode 16 is shown resting on a spacer particle 15 and is spaced thereby at a predetermined distance from the surface of the base metal 10. The roller electrode 16 has just passed over a particle 14a and during its brief contact with this particle has caused the particle to be heated by the resistance of the particle to the welding current. In the position of the electrode roller 16 shown in the drawing, the roller had just moved away from the heated conductive particle 14a with the consequent creation of an arc 25 between the electrode and the particle. It is apparent that the nonconductive spacer particle 15 on which the roller 16 rests not only determines the spacing of the roller from the base metal 10 but also determines the spacing of the roller from the heated conductive particle 14a. The roller electrode 16 is shown spaced from the conductive particle 14a by less than the width of a particle and the arc 25 is of a corresponding exceedingly short dimension with desirable results. The nonconductive spacer particles 15 also serve by their presence to prevent contact of the roller electrode 16 with too many conductive particles at one time thereby preventing overheating and avoiding the necessity of employing excessively heavy welding current.

When the short intensive arc 25 is created, the resultant heat reduces the particle to a molten state and at the same time correspondingly heats the area of the metal body 10 on which the particle is positioned. As a result, the conductive particle flattens and fuses into the material of the metal body 10. The drawing shows a conductive particle 14b that has been melted down in this manner.

In the initial pass of the electrode roller over a portion of the area of the layer of particles relatively few arcs will be struck because a particle must be heated sufficiently for thermionic emission to cause an arc to be created as the electrode moves out of contact with the particle. As the passes of the electrode over the area are rapidly repeated the arcs become numerous as numerous particles reach the required arc-forming temperature. With each pass of the electrode the alloying particles are flattened by the action of the arcs to permit the electrode to make contact with new alloying particles at lower levels. Usually the spacer particles soon begin to deteriorate and run off as slag, the effect being to permit the electrode to reach lower level alloy particles. With a relatively few rapidly repeated passes the process may be completed in a relatively extensive area.

If a high frequency welding current is employed to make it unnecessary for the electrode surfaces to make acual contact with the alloying particles, the electrode assembly may include suitable nonconducting spacer means for guiding contact with the layer of particles. For this purpose the electrode assembly may include the structure shown in FIG. 7 in which a carbon roller electrode 32 is provided with ceramic spacer flanges 34 for rolling contact with a layer of particles 35 on the surface of a metal body 36. The ceramic spacer flanges 34 may be provided by suitably bonding ceramic discs to the opposite ends of the carbon roller 32.

A number of examples will now be given of practices of the invention that are characterized by the use of spacer particles that are of approximately the same size as the alloying particles or at least of comparable size.

*Example 1–A*

50 grams crushed cast tungsten carbide (−40, +60 mesh)
10 grams silica (−40, +60 mesh)
5 grams graphite (−40, +60 mesh)

These three kinds of particles are thoroughly intermixed. The edge of a farm tool that is to be processed is brushed with a suitable adhesive solution and then the thoroughly mixed particles of the three materials are poured on to the tacky adhesive layer. The excess particles that are not bonded by the adhesive layer may be removed, for example by brushing off the loose particles or by inclining the farm tool sufficiently to cause the loose particles to drop away. The adhesive is then permitted to dry. The adhesive may be a solution of lacquer. In this instance the adhesive is made by dissolving 1 gram of K5000 ethyl cellulose in 100 cc. of a solvent consisting of 80% toluol and 20% isopropyl alcohol.

A graphite roller one inch in diameter and a half inch in width and the farm tool to be processed are connected to an A.C. transformer delivering 60 volts open circuit voltage. Several passes are made by the roller across the particle layer to cause the tungsten carbide particles to fuse into the surface of the farm tool.

The physical character of the layer of particles on the farm tool prior to the actual welding operation is, of the character shown in FIG. 1, both the silica particles and the graphite particles serving as spacer particles. The graphite particles, however, have the special function of promoting the formation of the minute arcs. When the electrode makes contact with such a carbon spacer particle, the carbon particle is initially heated by resistance to the current flow therethrough and then the carbon particle flashes or vaporizes to promote the formation of arc at the adjacent alloying particles. Since carbon has a negative coefficient of resistance, the resistance of the carbon particles decreases rapidly with rising temperature with consequent acceleration of current flow to accelerate the flashing or vaporizing action.

Almost any higher melting point alloying material can be substituted for the tungsten carbide. For example chromium metal, ferrochrome, ferro vanadium, ferro tungsten may be used. On a base metal of high carbon steel the thin fused surface layer is backed up by a hard martensitic layer which is very desirable from the standpoint of reducing wear.

It is to be noted that the process differs from percussive welding in that in percussive welding the arc is struck between two metal surfaces and when fusion starts the two surfaces are brought together to form the weld. In the present process, the final weld is completed by the arc, the arc being of a very short length.

The graphite particles may be omitted but have the advantage of speeding up the arcing of the alloying particles as explained above. In many instances the graphite particles are further desirable for adding carbon to the base metal. For example the carbon particles will increase the percentage of carbon at the surface of a ferrous body.

While FIG. 1 shows the layer on the base metal as being one particle thick, it is to be noted that even when it is attempted to form a layer of particles that is uniformly one particle thick, there will inevitably be portions of the layer that are more than one particle thick. The end result, however, is that all of the alloying particles are subjected to the welding action of the minute arcs. A number of the alloying particles may be initially electrically energized in series and there may be two or three arcs in series, but the repeated traverse of the particles by the electrode brings the alloy material of the particles down to the surface of the base metal.

Example 1–B 50 grams chromium metal (−40, +60 mesh)
5 grams graphite (−40, +60 mesh)
40 grams silica (−40, +60 mesh)
2 grams 40 Bé. sodium silicate
10 cc. $H_2O$ These ingredients are thoroughly mixed together and then the mixture is dried at 700° F. The sodium silicate serves to bind the particles together so that segregation does not occur. The particles are bound together in clusters since the relatively small quantity of sodium silicate merely wets the surfaces of the particles. If necessary the clusters are broken up into relatively small clusters. The clusters are caused to adhere to the surface of the metal body by means of the previously described ethyl cellulose solution. The layer applied to the base metal will be of the same general character as indicated in FIG. 1 except that the particles will be closer together since they are bonded together and much of the layer will be of multiple particle thickness instead of single particle thickness.

Example 1–C 25 gram aluminum powder (−60, +80 mesh)
40 gram Alundum (60 grit)
1 gram calcium carbonate
1 gram calcium fluoride
15 cc. of a 20% solution of phenol-formaldehyde resin in butyl alcohol The result of mixing these ingredients together is to produce a paint-like composition which may be applied as a coating to the base metal or metal body that is to be processed. It is not necessary to permit this coating to dry before the welding operation is carried out. FIG. 2 shows somewhat diagrammatically such a coating applied to the surface of a metal body 40. The coating comprises the alloying particles 42 of aluminum and the nonconducting refractory spacer bodies 44 of Alundum enveloped in the adhesive resin solution 45, the alloying particles and the spacer particles being of approximately the same size. The calcium carbonate and the calcium fluoride are incorporated in the adhesive resin 45. The calcium carbonate and the calcium fluoride are arc-stabilizing agents.

When a roller electrode is applied to the layer shown in FIG. 2 the resultant generation of heat causes thermal decomposition of the resin and since the resin comprises approximately 40% carbon the carbon is released by the thermal decomposition and is deposited on the adjacent particles including the alloying particles 42 to facilitate the creation of arcs in the manner heretofore explained.

The base metal 40 in FIG. 2 may be a ferrous metal or nickel or other metals or compounds of metals. To my knowledge no prior art welding procedure has been successfully applied to the welding of aluminum to iron, steel or nickel.

Example 1–D 13 grams graphite (−80, +100 mesh)
15 grams aluminum powder (−80, +100 mesh)
0.5 gram calcium fluoride (−325 mesh)
25 cc. of 20% solution of phenolic resin in butyl alcohol Here again the intermixture of the listed materials results in a paint-like composition for coating the base metal in preparation for the welding operation. This example is similar to the last example above, carbon spacer particles being substituted for the refractory nonconducting spacer particles. The coating on the base metal is of the character shown in FIG. 2. The graphite spacer particles flash to promote the formation of the minute arcs as heretofore explained. Here again the base metal may be an unusual base metal for aluminum welding such as a base metal of iron, steel or nickel.

Example 1–E 10 grams graphite (−30, +40 mesh)
50 grams silica (−30, +40 mesh)

These two materials may be thoroughly intermixed and may then be caused to adhere to base metal by coating the base metal with the ethyl cellulose solution as explained in Example 1–A.

In this example the graphite particles are to be regarded as the alloying particles, the silica particles being the spacer particles. The particles are bonded to the surfaces of ferrous base metal and when the roller electrode is passed over the coating in the manner heretofore described with consequent flashing of the graphite particles, carbon is introduced into the surface of the ferrous base metal to result in a hard high carbon surface.

The following two examples illustrate the use of spacer particles that are coated with the alloying particles.

Example 2–A 75 grams tungsten carbide (6% carbon, particle size 3–5 microns)
32 grams Alundum ($Al_2O_3$) (−30, +40 mesh)
1 gram calcium carbonate
20 cc. 20% solution of an alcohol soluble phenol-formaldehyde thermosetting resin in butyl alcohol
1 gram expanded silica The mixture of these ingredients results in a paint-like composition which, when applied to the surface of a metal body produces a coating of the character shown diagrammatically in FIG. 3.

FIG. 3 shows the composition coating the surface of a metal body 50. The nonconductive refractory spacer particles 52 of Alundum are enveloped in the resin adhesive 54 in which the remaining ingredients are incorporated. The spacer particles 52 are on the order of 250 times larger than the alloying particles of tungsten carbide which are represented by dots in the adhesive resin. In effect the adhesive resin serves to coat the relatively large spacer particles 52 with the exceedingly minute alloying particles. The calcium carbonate arc stabilizer is also in the coating on the surface of each of the spacer particles 52. When the welding operation is started in the manner heretofore described the decomposition of the adhesive resin produces carbon to promote the arcing of the minute alloying particles of tungsten carbide. The expanded silica aids in preventing compaction of the mixture during storage.

Apparently there is some wastage of the fine particles of tungsten carbide that are in the regions between the spacer particles 52 as distinguished from the tungsten carbide particles that are immediately adjacent the surfaces of the spacer particles 52 to take advantage of the carbon that is deposited on the spacer particles. This wastage may be avoided by a modified procedure in which the spacer particles are coated with the fine particles of tungsten carbide before the paint-like composition is mixed.

In this modified procedure the expanded silica is omitted. The tungsten carbide particles and the spacer particles of Alundum are wetted with an adhesive which may be cellulose nitrate. The dampened particles are tumbled to cause the fine tungsten carbide particles to adhere to the larger Alundum particles. The materials is then dried and broken up to pass through a 40 mesh screen. The resultant clusters consisting of the spacer particles of Alundum with the fine particles of tungsten carbide adhering thereto are mixed with the phenolic resin solution to produce the required paint mixture. It is to be noted that the cellulose nitrate adhesive and the phenolic resin adhesive are not soluble in each other.

FIG. 4 shows the resulting paint-like mixture applied to the surface of a metal body 60. The coating, which preferably also includes the calcium carbonate, envelops the relatively large spacer particles 62 of Alundum and each particle of Alundum is coated with the small particles 64 of tungsten carbide. In some places the layer may be of the thickness of two of the spacer particles 62 as shown but the adhesive 65 envelops the outer spacer particles as well as the inner spacer particles for the deposition of carbon thereon by thermal decomposition of the adhesive.

*Example 2-B*

14 grams graphite (—20, +30 mesh)
76 grams amorphous tungsten carbide (3 to 5 microns in size)
1 gram calcium carbonate
25 cc. of 20% solution of an alcohol soluble phenol-formaldehyde resin in butyl alcohol The paint-like composition produced by mixing these ingredients is applied to the surface of a metal body to produce a coating of the character shown in FIG. 3. The procedure may be modified by using a first adhesive to bond the fine tungsten carbide particles to the larger graphite particles and then using a second adhesive such as the 20% resin solution together with calcium carbonate to form the final paint mixture in the previously-described manner. This modified procedure produces a coating on the base metal of the character shown in FIG. 4.

*Example 3*

50 grams crushed cast tungsten carbide (—40, +60 mesh)
1 gram calcium carbonate
6 cc. of 20% solution of an alcohol soluble phenol-formaldehyde resin in butyl alcohol This mixture produces a paint in which the tungsten carbide particles are enveloped by the adhesive resin, the resin incorporating the calcium carbonate. The tungsten carbide particles soon become coated with a film of carbon resulting from the thermal decomposition of the thermosetting resin. Thus the coating is of the general character illustrated by FIG. 4 except that the carbon that coats the large particles is in the form of a film instead of being formed by small discrete particles. In stating that the coating is similar to that shown in FIG. 4 it is to be understood that the large particles are alloying particles coated with carbon instead of being spacer particles coated with alloy.

As each of the carbon coated tungsten carbide particles melts under the action of an individual arc the roller electrode comes into contact with other particles that are still intact. Since there are always unmelted particles present until the very end of the welding operation, the alloying particles themselves function as spacers to control the length of the minute arcs.

Instead of using the carbon containing phenol resin, a resin that is free of carbon may be used and the carbon may be provided in the form of lamp black or finely divided graphite.

FIG. 5 shows the character of the coating on the base metal which is produced by incorporating fine carbon particles in a carbon-free adhesive. In FIG. 5 the coating 70 comprises relatively large alloying particles 72 of tungsten carbide enveloped in adhesive 74, which adhesive incorporates minute carbon particles represented by dots. If the first procedure is followed of employing a carbon-containing resin the coating would be of a character shown in FIG. 5 with the dots omitted. A carbon-free adhesive that is suitable for this purpose consists of acrylic resin dissolved in toluene.

*Example 4*

30 grams NiO (—100 mesh)
7½ grams lamp black
15 grams Alundum (60 grit)
5 grams calcium carbonate
25 cc. 20% solution of an alcohol soluble phenol-formaldehyde thermosetting resin in butyl alcohol In this paint-like composition the lamp black not only makes a conductive coating for promoting the creation of the minute arcs as heretofore explained but also serves to reduce the NiO to pure nickel. The reduced nickel is then incorporated into the base metal by the action of the arcs. When this coating was used on 10–18 steel, the steel resisted oxidation over an extensive test period of 1800° F. Oxides of other metals such as chrome and tungsten may be employed in the same manner, the procedure being especially advantageous where the metal in oxide form is substantially cheaper than the pure metal.

In FIG. 6 illustrating the character of such a coating applied to a base metal 80 the spacer particles 82 of Alundum are surrounded by the somewhat smaller nickel oxide particles 84 in an adhesive envelope 85 that contains lamp black indicated by small dots. The reduced nickel may form a nickel deposit on aluminum base metal, a result that has not been achieved heretofore within my knowledge.

*Example 5*

30 grams high carbon ferrochrome (70% chromium, 28% iron, 2% silicon) (—100 mesh)
17 grams Alundum ($Al_2O_3$) (60 grit)
20 grams ferro boron (17% boron) (—100 mesh)
1 gram $TiO_2$
1 gram potassium carbonate
1 gram fluorspar
20 cc. 20% solution of an alcohol soluble phenol-formaldehyde thermosetting resin in butyl alcohol In the electric arc processing of this coating the ferrochrome and the ferro boron combine to form exceedingly hard chromium boride and the chromium boride is arc welded to the base metal. $TiO_2$ functions as a deoxidizer.

Tungsten powder and carbon powder may be substituted for the ferrochrome and the ferro boron to produce tungsten carbide, or tungsten carbide powder and iron powder may be substituted for combination, or chromium powder and carbon powder may be substituted to produce chromium carbide.

It is apparent from the foregoing examples that the invention avoids the disadvantages of prior art welding methods heretofore discussed. With reference to avoiding "burn through" and undesirable heating of the base metal, it is especially advantageous that any of the processes set forth in the above examples may be carried out with the base metal and the coating layer thereon completely submerged in water. Deposits may be made on thin sheets or sharp edges without burn through. High carbon steels may be readily welded with no preheat and with no occurrence of cracking. The process is economical in the use of labor and material. No special equipment is needed. The only equipment necessary is a conventional arc welding equipment and a conductive electrode of the character described. No special skill is required. Unskilled labor can easily perform the welding operation with satisfaction and may do so after relatively little instruction. The welding operation has a low actinic ray level since the arcs are extremely short and the operator's eyes are partially shielded by the roller electrode. Light colored glass goggles that are opaque to ultra violet provides sufficient protection. The level of heat produced on the enviroment by the welding operation is low so that the operator does not require special protective clothing. The deposits are thin and make use of the base metal by alloying with the base metal to produce a new alloy suitable for the purpose at hand. This fact is especially important for knives, farm tools and the like where a thin edge must be maintained.

While the surface of the base metal may be practically completely covered by repeating the whole cycle, as heretofore noted, in many instances the purpose of the weld deposit is served satisfactorily with liberal spacing between the welds formed by the individual alloying particles. In the hard facing of farm tools, for example, the "shadow effect" exerted by a hard particle upon the wear of the metal behind the hard particle as the tool is pulled through the ground makes it unnecessary for the surface to be completely covered with the abrasive-resistant deposits.

Oxidation-resistant surfaces can be created by welding closely spaced deposits of such materials as aluminum, nickel and chromium on to the surface of the base metal. If such a metal body with the spaced deposits is subjected to heat in its normal service, the heat will diffuse the scattered alloying deposits out into the adjacent exposed areas of the base metal surface. If sufficient heat is not involved in the normal service of the base metal, it may be heat treated in advance to cause the desired diffusion for oxidation resistance.

Incomplete coverage of the base metal may also provide adequate oxidation resistance by causing initially formed oxides to be securely attached to the base metal. The closely spaced weld deposits mechanically key or anchor the intervening oxide coating to the base metal.

My description in specific detail of the selected practices of the invention will suggest various changes, substitutions and other departures from my disclosure within the spirit and scope of the appended claims.

I claim:

1. A method of processing the surface of a metal body, including the steps of: forming a layer of finely divided particles on the surface of the metal body including conducting particles of alloying material; placing said body in a welding circuit with an electrode many times wider than the particles; and passing said electrode over the particles at close spacing to the surface of the body to cause the electrode to strike numerous intermittent random arcs with the alloying particles with the arcs distributed over the width of the electrode.

2. A method as set forth in claim 1 in which said alloying particles are coated with carbon.

3. A method as set forth in claim 1 in which said layer includes an organic adhesive material that decomposes under heat to provide carbon to facilitate the striking of the arcs.

4. A method as set forth in claim 1 in which said welding circuit provides high frequency current to cause the arcs to form without the necessity of the electrode making contact with the alloying particles.

5. A method as set forth in claim 1 in which said layer includes particles of refractory material to serve as minimum spacing means between the electrode and the metal body.

6. A method as set forth in claim 5 in which said alloying particles are minute in size in comparison with the refractory particles and are bonded to the surface of the refractory particles.

7. A method as set forth in claim 1 which include particles of carbon to serve as minimum spacing means between the electrode and the metal body.

8. A method as set forth in claim 7 in which the alloying particles are minute in size in comparison with the carbon particles.

9. A method as set forth in claim 1 in which said layer includes particles of an oxide of a metal and includes carbon for reduction of the oxide to release the metal of the oxide for welding to the metal body.

10. A method as set forth in claim 1 in which said layer includes particles of two different materials to form a compound of the two materials under the heat created by the arcs, at least one of said two materials being metallic.

11. A method as set forth in claim 1 in which said electrode is in the form of a roller and in which the electrode is rolled on said layer.

12. A method as set forth in claim 1 in which said layer includes particles of alloying material and particles of carbon that are minute in size in comparison with the alloying particles.

13. A method as set forth in claim 1 in which said layer comprises essentially nonconducting spacer particles and particles of carbon to form a hard high carbon surface on the metal body.

14. A method of processing the surface of a metal body, including the steps of: forming a layer on the surface of the metal body including conducting particles of alloying material; placing said metal body in a high frequency welding circuit with an electrode having an electrode surface many times wider than the particles; moving said electrode over said layer with a portion of the electrode in contact with the layer to maintain said electrode surface at close spacing from the surface of the metal body to strike numerous arcs with the individual alloying particles with the arcs distributed over the width of said electrode surface.

15. A method as set forth in claim 1 in which said electrode is a roller with a peripheral nonconducting spacer for rolling contact with said layer.

16. A method of processing the surface of a metal body, including the steps of: forming a paint-like composition of finely divided solid particles in an adhesive liquid medium including particles of alloying material; coating said surface with said composition to bond the particles to the surface; placing said body in a welding circuit with an electrode many times wider than the particles; and passing said electrode over the coating at close spacing to the surface of the body to cause the electrode to strike numerous intermittent random arcs with the alloying particles with the arcs distributed over the width of the electrode.

17. A method as set forth in claim 16 in which said solid particles include heat-resistant particles and particles of alloying material that are minute in size in comparison with the heat-resistant particles to result in a layer on said surface in which the heat-resistant particles are coated with adhesive incorporating the alloying particles.

18. A method as set forth in claim 17 in which said heat-resistant particles are particles of nonconducting refractory material.

19. A method as set forth in claim 17 in which said heat-resistant particles are carbon particles.

20. A method as set forth in claim 16 which includes the steps of: mixing particles including relatively large heat-resistant particles and particles of alloying material of minute size in comparison with the heat-resistant particles with adhesive material to cause the particles to bond together; permitting the adhesive material to harden to form relatively large hard masses; breaking up the massed material to granular form; and mixing the granular material with adhesive material to form the paint-like compositions, neither of said two adhesive materials being soluble in the other.

21. An apparatus for welding small particles of alloying material to the surface of a metal body, comprising: an electrode in the form of a roller many times wider than the particles; means to journal said roller for rolling the roller over a layer of the particles on said surface; means for connection to said journal means and to said body to form a welding circuit including said roller to strike numerous arcs with the individual particles as the roller moves over the layer; and spacer means connected with the electrode to keep the surface of the electrode spaced from the surface of said body.

22. An apparatus as set forth in claim 21 in which said spacer means is a flange on the roller of heat-resistant nonconducting material to keep the surface of the roller spaced from the layer; and in which said welding circuit provides high frequency current to form the arcs across the gap between said surface and the layer.

References Cited in the file of this patent

UNITED STATES PATENTS

| | | |
|---|---|---|
| 717,080 | Coleman | Dec. 30, 1902 |
| 1,395,269 | Gebauer | Nov. 1, 1921 |
| 1,791,968 | Morgan | Feb. 10, 1931 |
| 1,960,042 | Andrus | May 22, 1934 |
| 2,318,263 | Smith | May 4, 1943 |
| 2,611,710 | Woock | Sept. 13, 1952 |